(12) United States Patent
Hsiao et al.

(10) Patent No.: US 11,253,755 B2
(45) Date of Patent: Feb. 22, 2022

(54) PROCESS FOR MANUFACTURING A GOLF CLUB HEAD

(71) Applicant: Advanced International Multitech Co., Ltd., Kaohsiung (TW)

(72) Inventors: Te-Fu Hsiao, Kaohsiung (TW); Yuan-Jen Hou, Kaohsiung (TW)

(73) Assignee: Advanced International Multitech Co., Ltd., Kaohsiung (TW)

( * ) Notice: Subject to any disclaimer, the term of this patent is extended or adjusted under 35 U.S.C. 154(b) by 506 days.

(21) Appl. No.: 15/814,596

(22) Filed: Nov. 16, 2017

(65) Prior Publication Data

US 2019/0030401 A1 Jan. 31, 2019

(30) Foreign Application Priority Data

Jul. 26, 2017 (TW) .................. 106125010

(51) Int. Cl.
*A63B 53/04* (2015.01)
*B29C 70/42* (2006.01)

(52) U.S. Cl.
CPC .......... *A63B 53/04* (2013.01); *A63B 53/0466* (2013.01); *B29C 70/42* (2013.01); *A63B 53/042* (2020.08); *A63B 2209/02* (2013.01)

(58) Field of Classification Search
CPC ..... B29C 70/46; B29C 70/541; B29C 70/543; B29C 33/42
See application file for complete search history.

(56) References Cited

U.S. PATENT DOCUMENTS

| | | | | |
|---|---|---|---|---|
| 3,761,338 | A * | 9/1973 | Ungar et al. ............ | B44C 3/085 156/219 |
| 5,108,532 | A * | 4/1992 | Thein .................... | B29C 43/203 156/285 |
| 5,310,185 | A * | 5/1994 | Viollaz .................. | A63B 53/04 473/330 |
| 9,452,488 | B2 | 9/2016 | Simone et al. | |
| 2004/0089965 | A1* | 5/2004 | Malfliet ................ | B29C 44/582 264/46.6 |
| 2005/0171292 | A1* | 8/2005 | Zang .................... | C08K 5/0025 525/330.3 |

* cited by examiner

*Primary Examiner* — Matthew J Daniels
(74) *Attorney, Agent, or Firm* — DLA Piper LLP (US)

(57) ABSTRACT

A process for manufacturing a golf club head includes steps of: placing a patterned release film on a lower mold half, making the patterned release film intimately contact an upward pressed region of the lower mold half, laminating a carbon fiber composite sheet on the patterned release film to form a laminate, hot-pressing the laminate by pressing a downward pressing region of an upper mold half toward the upward pressed region of the lower mold half to thereby form a decorative piece, and fitting the decorative piece into a depressed region of a club head body to obtain the golf club head.

10 Claims, 16 Drawing Sheets

PROCESS FOR MANUFACTURING A GOLF CLUB HEAD

CROSS-REFERENCE TO RELATED APPLICATION

This application claims priority of Taiwanese Application No. 106125010, filed on Jul. 26, 2017.

FIELD

The disclosure relates to a process for manufacturing a golf club head, and more particularly to a process for manufacturing a golf club head which includes a club head body and a decorative piece having a patterned topological region to make up an outer surface of the club head body.

BACKGROUND

U.S. Pat. No. 9,452,488 discloses a method of forming a golf club head assembly including a golf club head and a faceplate. Since the golf club head is formed from a cast material and the faceplate is formed from an alloy, decorative variation in appearance of the golf club head assembly, specifically the golf club head, is limited. It is therefore desirable in the art to provide variation in the appearance of the golf club head in addition to enhancing the striking performance and characteristics thereof.

SUMMARY

An object of the disclosure is to provide a process for manufacturing a golf club head having variation in appearance.

According to a first aspect of the disclosure, there is provided a process for manufacturing a golf club head which includes a club head body that is formed with a depressed region and a decorative piece that is fitted into the depressed region of the club head body in conformity with shape of the depressed region and that has a patterned topological region to make up an outer surface of the club head body. The process comprises steps of:

(a) placing a patterned release film on a lower mold half which has an upward pressed region configured to simulate a geometry of the patterned topological region of the decorative piece;

(b) making the patterned release film intimately contact the upward pressed region of the lower mold half;

(c) laminating a carbon fiber composite sheet on the patterned release film to form a laminate;

(d) hot-pressing the laminate by pressing a downward pressing region of an upper mold half toward the upward pressed region of the lower mold half to thereby form the decorative piece; and (e) fitting the decorative piece into the depressed region of the club head body to obtain the golf club head.

According to a second aspect of the disclosure, there is provided a process for manufacturing a golf club head which includes a club head body that is formed with a depressed region and a decorative piece that is fitted into the depressed region of the club head body in conformity with shape of the depressed region and that has a patterned topological region to make up an outer surface of the club head body. The process comprises steps of:

(a) placing a patterned release film on a lower mold half which has an upward pressed region;

(b) making the patterned release film intimately contact the upward pressed region of the lower mold half;

(c) laminating a carbon fiber composite sheet on the patterned release film to form a laminate;

(d) hot-pressing the laminate by pressing a downward pressing region of an upper mold half toward the upward pressed region of the lower mold half to thereby form the decorative piece, the downward pressing region being configured to simulate a geometry of the patterned topological region of the decorative piece; and (e) fitting the decorative piece into the depressed region of the club head body to obtain the golf club head.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
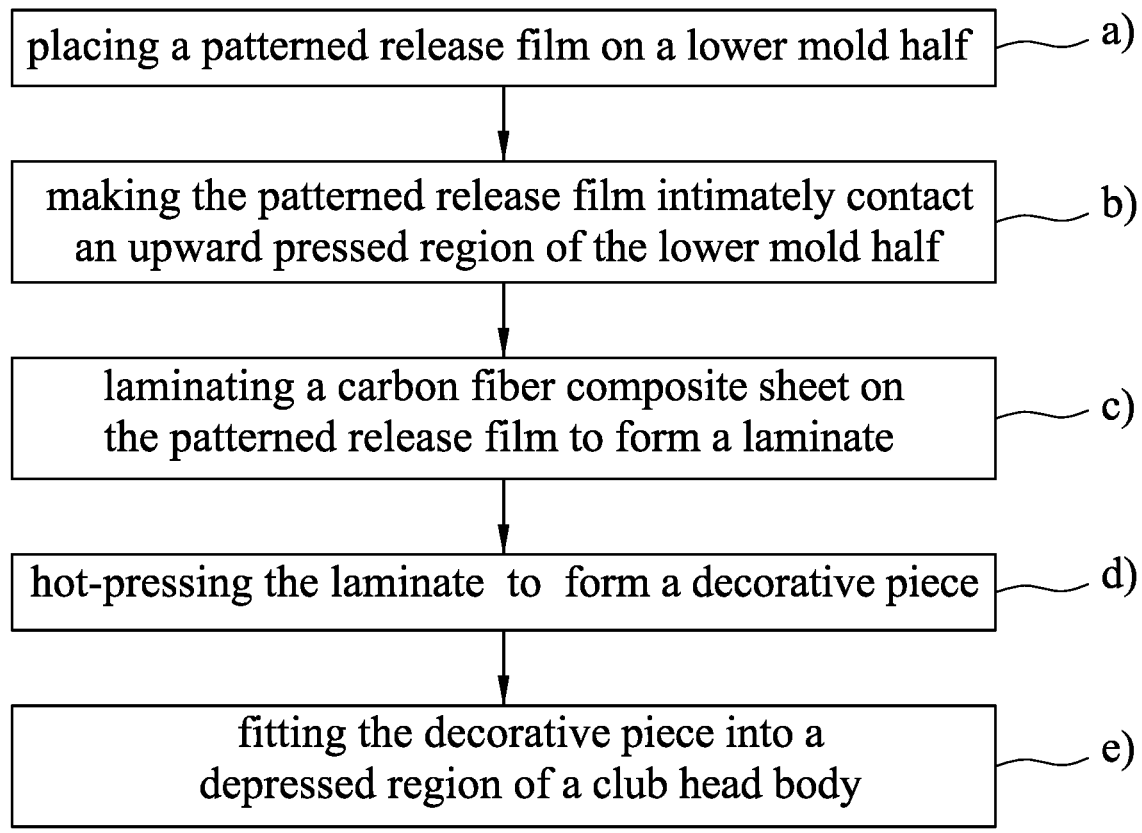
FIG. 1 is a block diagram of a first embodiment of a process for manufacturing a golf club head according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a process for manufacturing a golf club head is shown to comprise steps of: a) placing a patterned release film on a lower mold half; b) making the patterned release film intimately contact an upward pressed region of the lower mold half; c) laminating a carbon fiber composite sheet on the patterned release film to form a laminate; d) hot-pressing the laminate to forma decorative piece; and e) fitting the decorative piece into a depressed region of a club head body.

Figure 6:
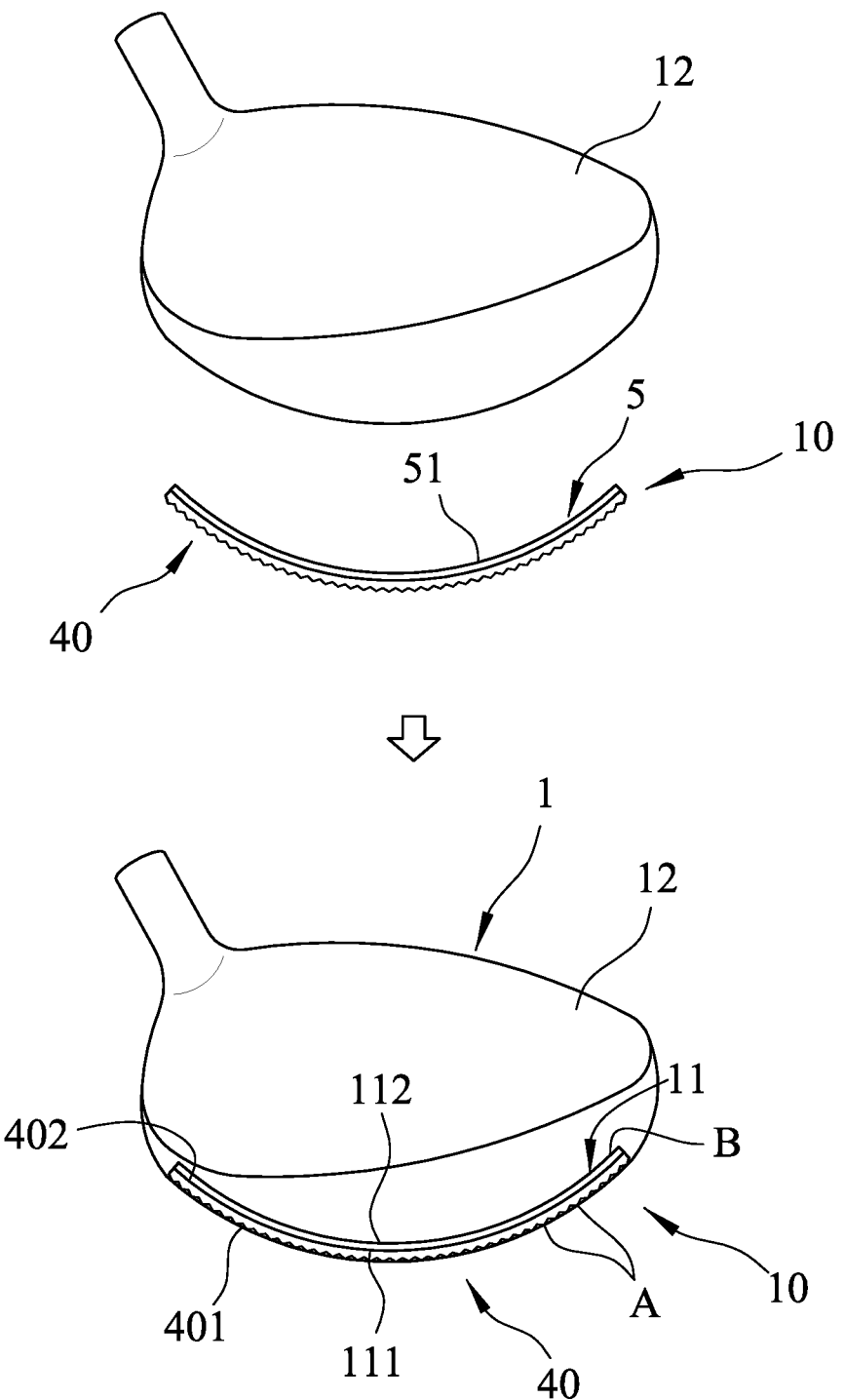
Figure 7:
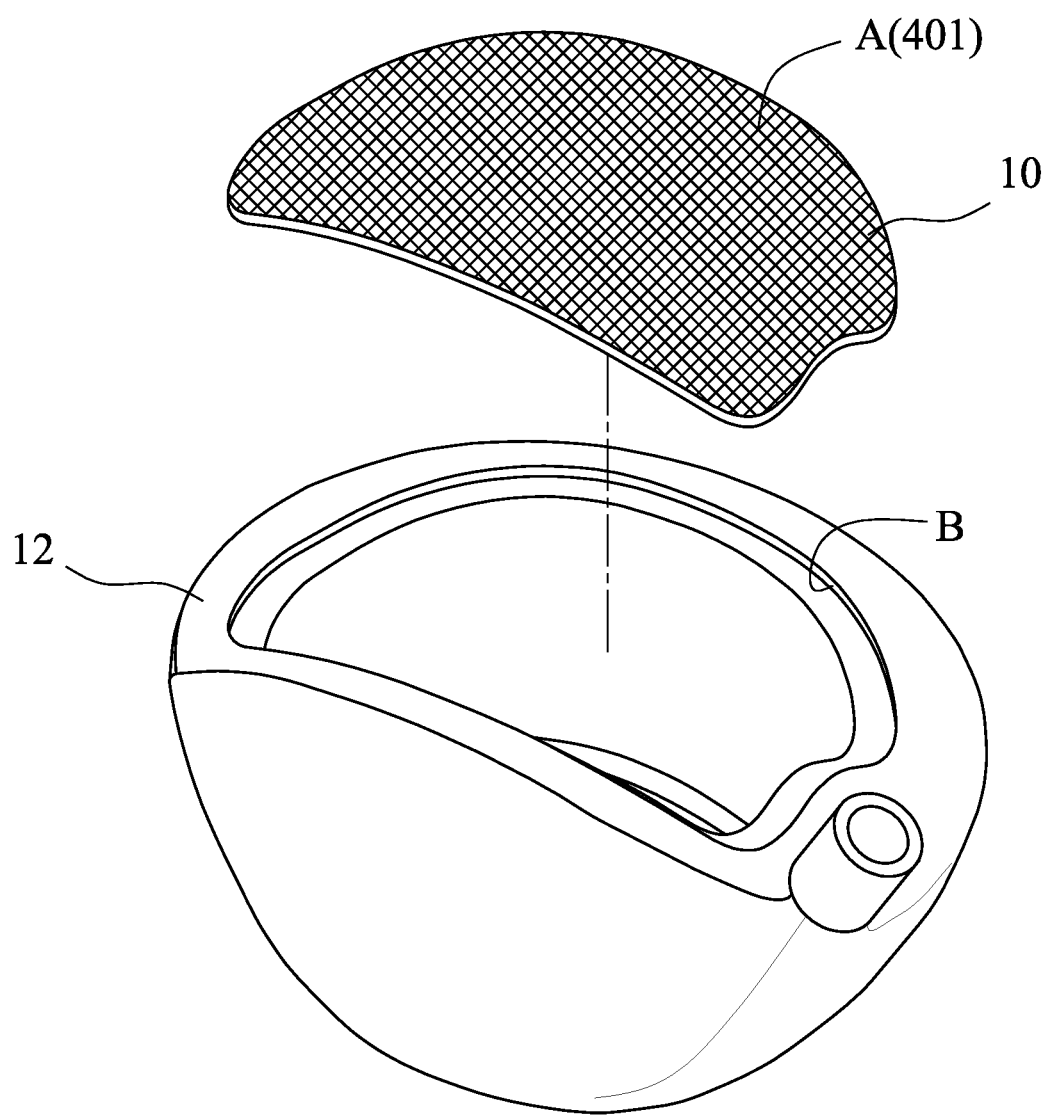
FIG. 7 is an exploded perspective view of a golf club head manufactured by the first embodiment.

Referring to FIGS. 6 and 7, a golf club head 1 manufactured by the first embodiment includes a club head body 12 that is formed with a depressed region (B) and a decorative piece 10 that is fitted into the depressed region (B) of the club head body 12 in conformity with the shape of the depressed region (B) and that has a patterned topological region (A) to make up an outer surface of the club head body 12.

Figure 2:
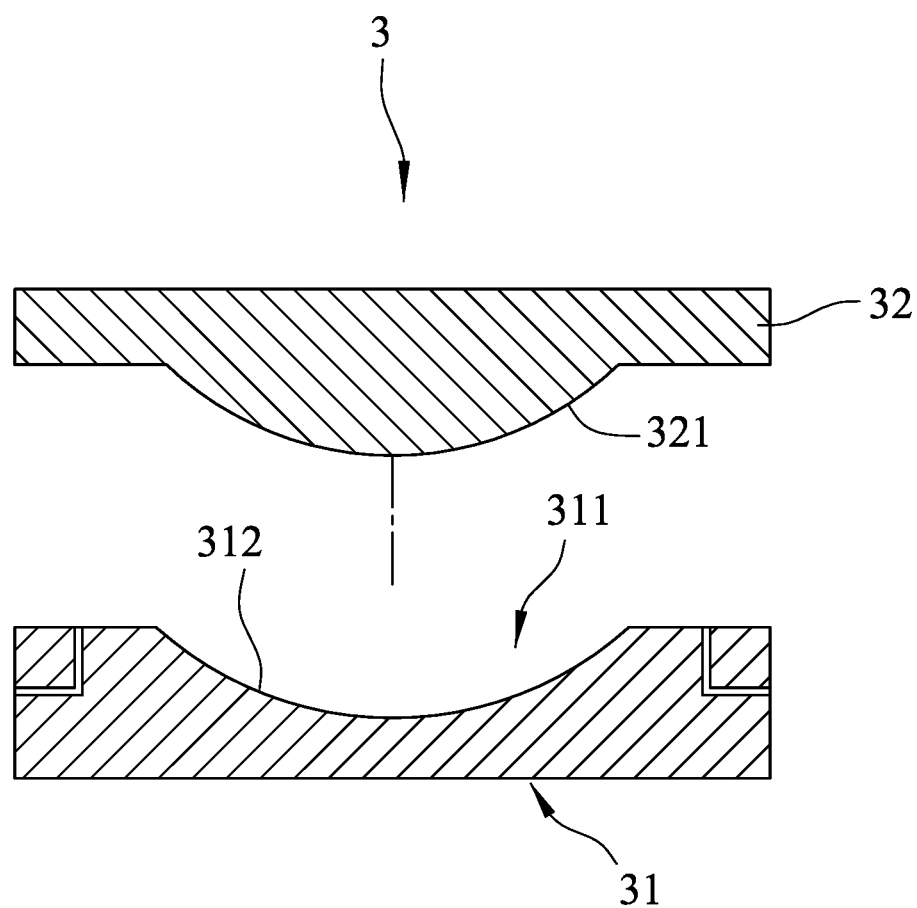
FIG. 2 is a schematic sectional view of a mold used for the first embodiment.

Referring to FIG. 2, a hot-pressing mold 3 is used in the first embodiment, and is shown to include a lower mold half 31 and an upper mold half 32. The lower mold half 31 has an upward pressed region 312 which is configured to simulate a geometry of the patterned topological region (A) of the decorative piece 10 and which defines a mold cavity 311. The upper mold half 32 has a downward pressing region 321. The upward pressed region 312 of the lower mold half 31 is a concave surface, and the downward pressing region 321 of the upper mold half 32 is a convex surface configured to mate with the concave surface.

Figure 3:
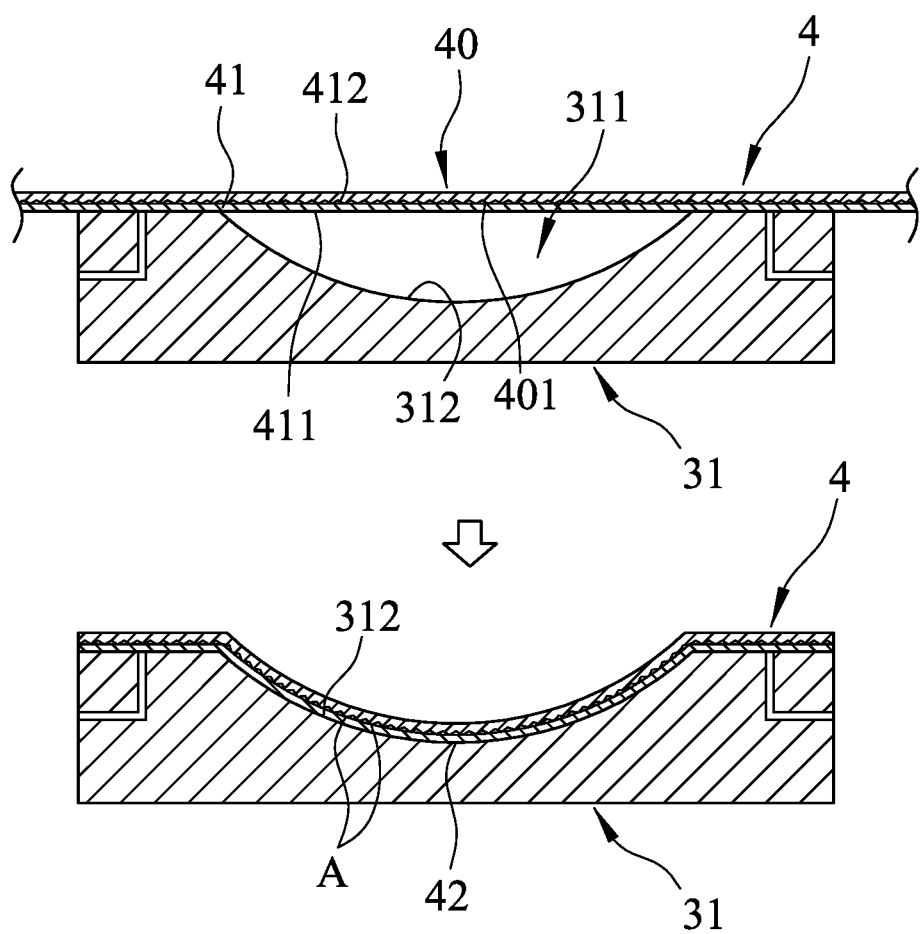
FIGS. 3 to 6 are schematic views showing consecutive steps of the first embodiment.

Referring to FIG. 3, in step a), a patterned release film 4 is placed on the lower mold half 31. The patterned release film 4 includes a releasing layer 41 which is releasable and which has a lower surface 411 and an upper surface 412 opposite to each other, and a pattern transfer layer 40 which has a patterned region 401 that is to be formed as the patterned topological region (A) of the decorative piece 10 and that is releasably attached to the upper surface 412 of the releasing layer 41.

In this embodiment, the patterned region 401 of the pattern transfer layer 40 is a textured surface. Alternatively, the patterned region 401 of the pattern transfer layer 40 may be a plain patterned surface.

In step b), the patterned release film 4 is made to intimately contact the upward pressed region 312 of the lower mold half 31 by vacuum pumping. Specifically, the lower surface 411 of the releasing layer 41 of the patterned release film 4 is brought into intimate contact with the upward pressed region 312 of the lower mold half 31.

Figure 4:
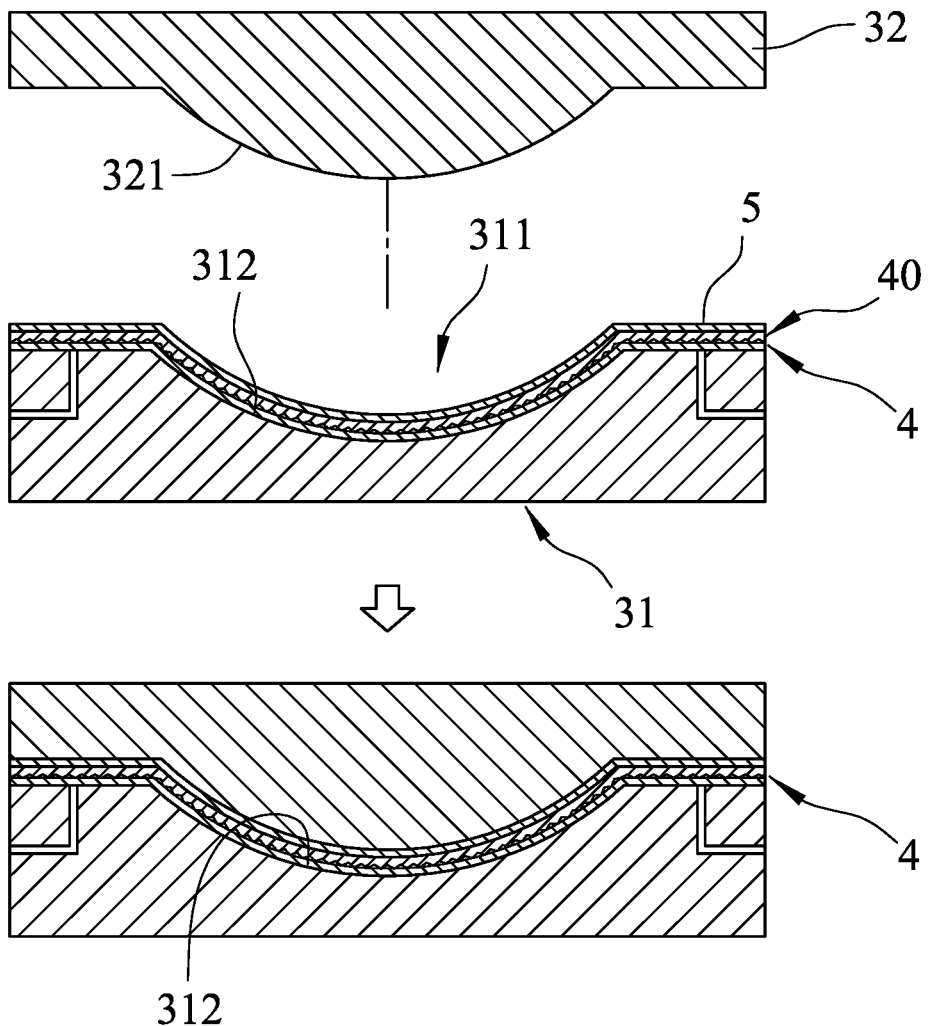
Figure 5:
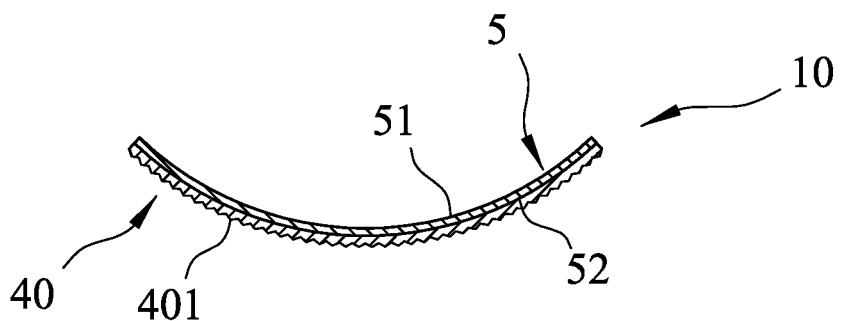

Referring to FIG. 4, in step c), a carbon fiber composite sheet 5 is laminated on the patterned release film 4 to form a laminate. The carbon fiber composite sheet 5 is made by combining a plurality of carbon fibers with a resin matrix.

In step d), the laminate is hot-pressed by pressing the downward pressing region 321 of the upper mold half 32 toward the upward pressed region 312 of the lower mold half 31 at a molding temperature ranging from 120° C. to 180° C. to thereby form the decorative piece 10 which is releasably attached to the release layer 41. The releasing layer 41 is released from the pattern transfer layer 40 to obtain the decorative piece 10.

Referring to FIG. 6, in step e), the decorative piece 10 is fitted into the depressed region (B) of the club head body 12 to obtain the golf club head 1. Specifically, a free surface 51 of the carbon fiber composite sheet 5 of the decorative piece 10 is adhered to the depressed region (B) of the club head body 12.

Referring further to FIGS. 6 and 7, as described above, the golf club head 1 manufactured by the first embodiment includes the club head body 12 that is formed with the depressed region (B) and the decorative piece 10 fitted into the depressed region (B) of the club head body 12 and having a patterned topological region (A) to make up the outer surface of the club head body 12. The decorative piece 10 is composed of the carbon fiber composite sheet 5 and the pattern transfer layer 40 which is adhered to the carbon fiber composite sheet 5 and which has a patterned region 401 formed as the patterned topological region (A) of the decorative piece 10. It should be noted that the location of the depressed region (B) on the club head body 12 is not limited to that illustrated in FIG. 7, and may be on a top portion, a bottom portion, or other portions of the club head body 12. Since the carbon fiber composite sheet 5 is a light-weight structural material with high mechanical strength, the golf club head 1 thus manufactured may have a reduced total weight while maintaining a sufficient mechanical strength.

In addition, the patterned topological region (A) of the decorative piece 10 may be a textured surface, as illustrated in the first embodiment, or a plain patterned surface. Therefore, the patterned topological region (A) of the decorative piece 10 is provided with an appearance different from that of the remaining portion of the outer surface of the club head body 12. Furthermore, the appearance of the patterned topological region (A) of the decorative piece 10 may be varied by changing the roughness of the textured surface of the patterned topological region (A). Alternatively, when the pattern transfer layer 40 is made from a transparent material, the texture of the carbon fiber composite sheet 5 may be viewed through the pattern transfer layer 40. Therefore, the overall appearance of the golf club head 1 manufactured by the method according to the disclosure may be varied as desired.

Figure 8:
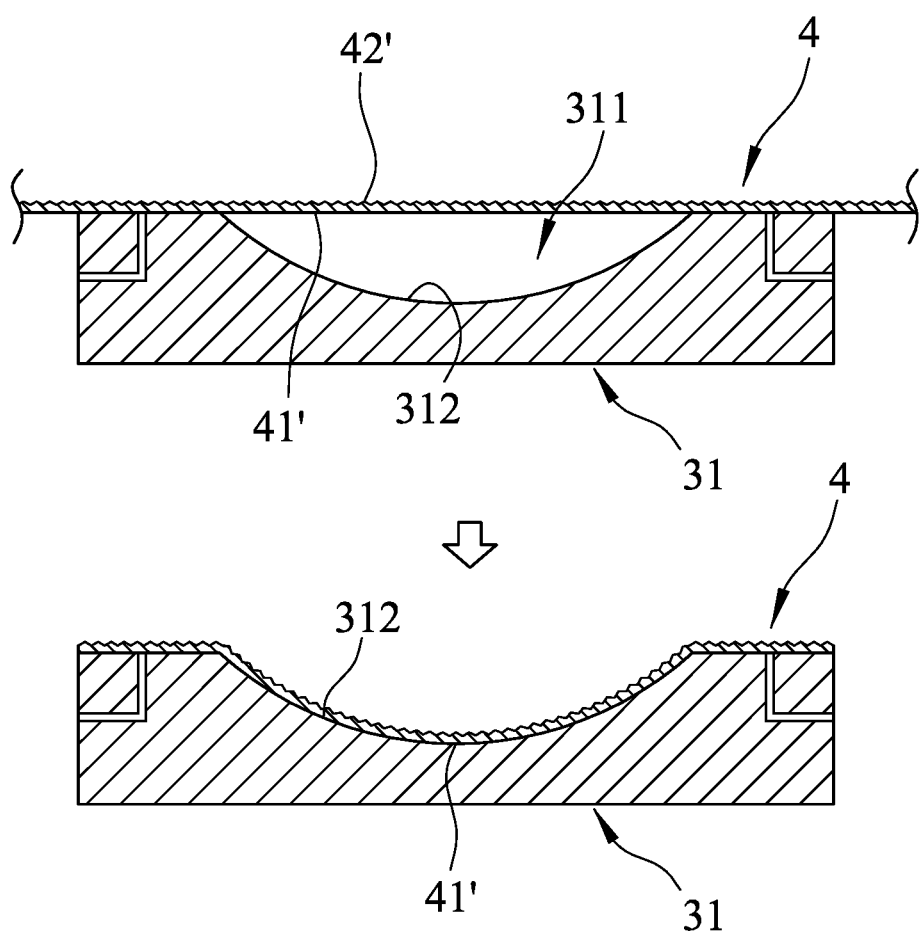
FIGS. 8 to 10 are schematic views showing consecutive steps of a second embodiment of a process for manufacturing a golf club head according to the disclosure.
Figure 9:
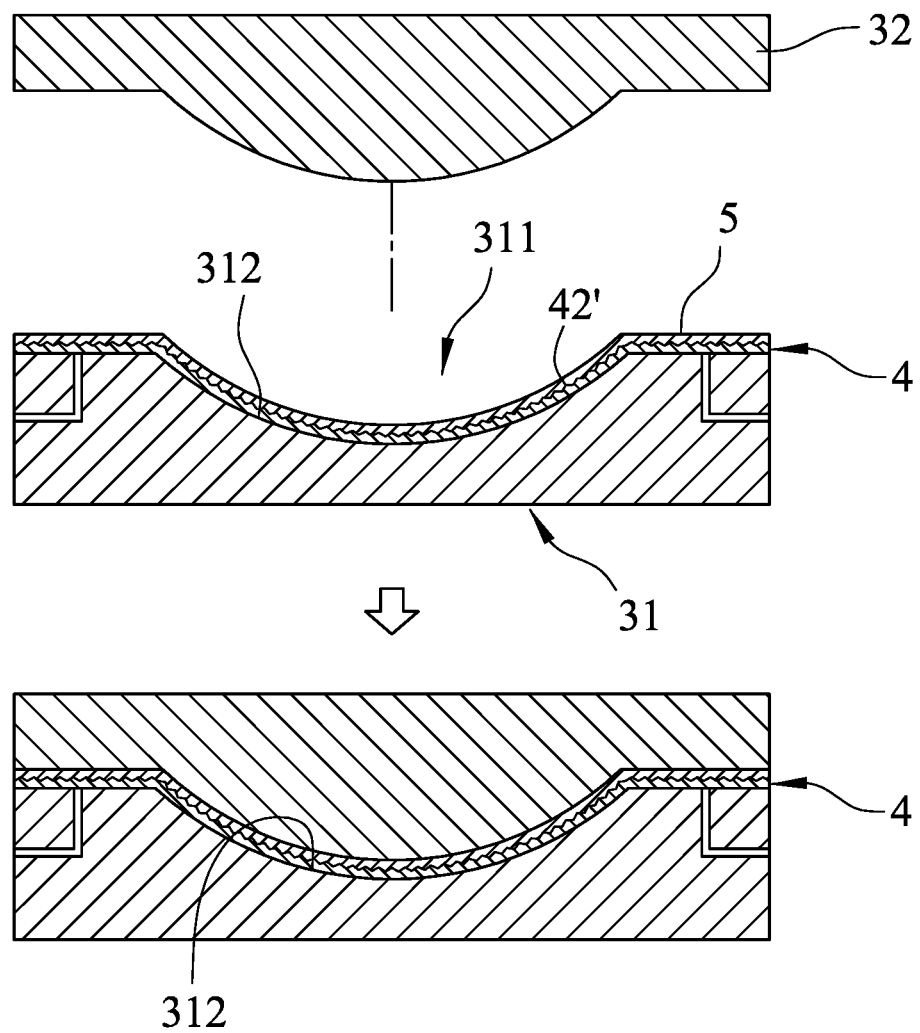
Figure 10:
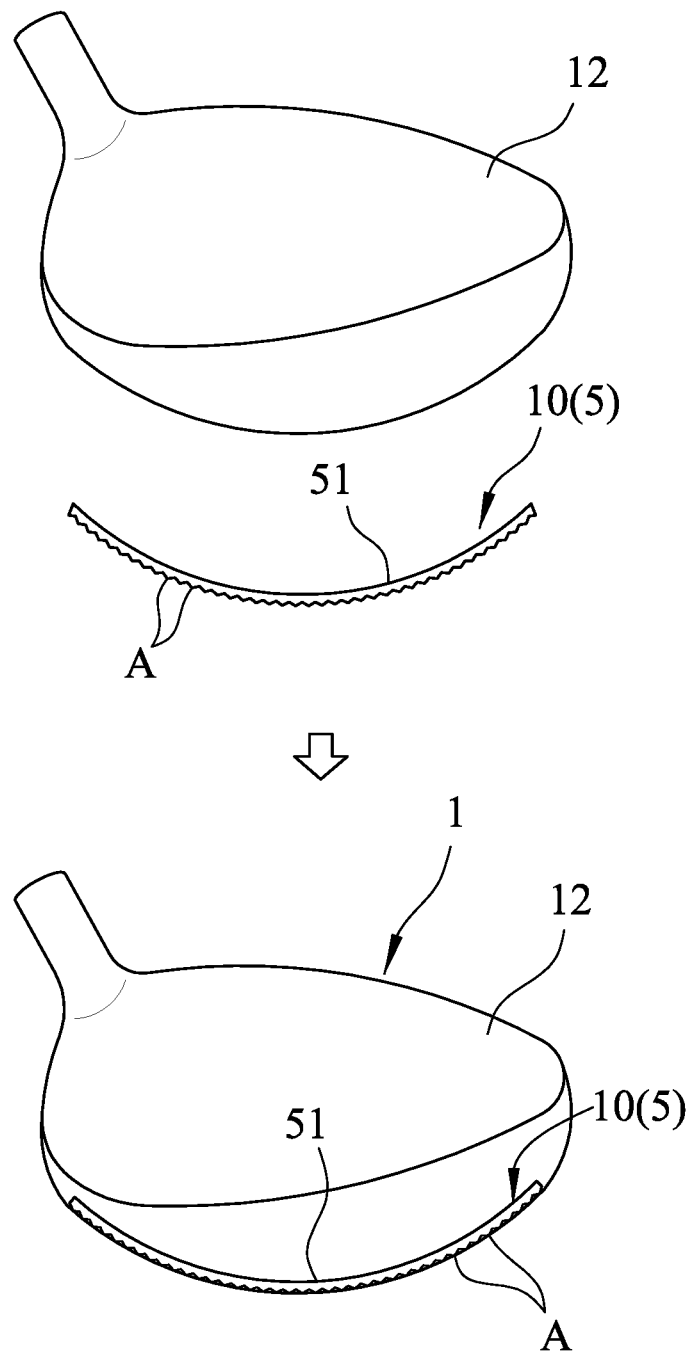
Figure 11:
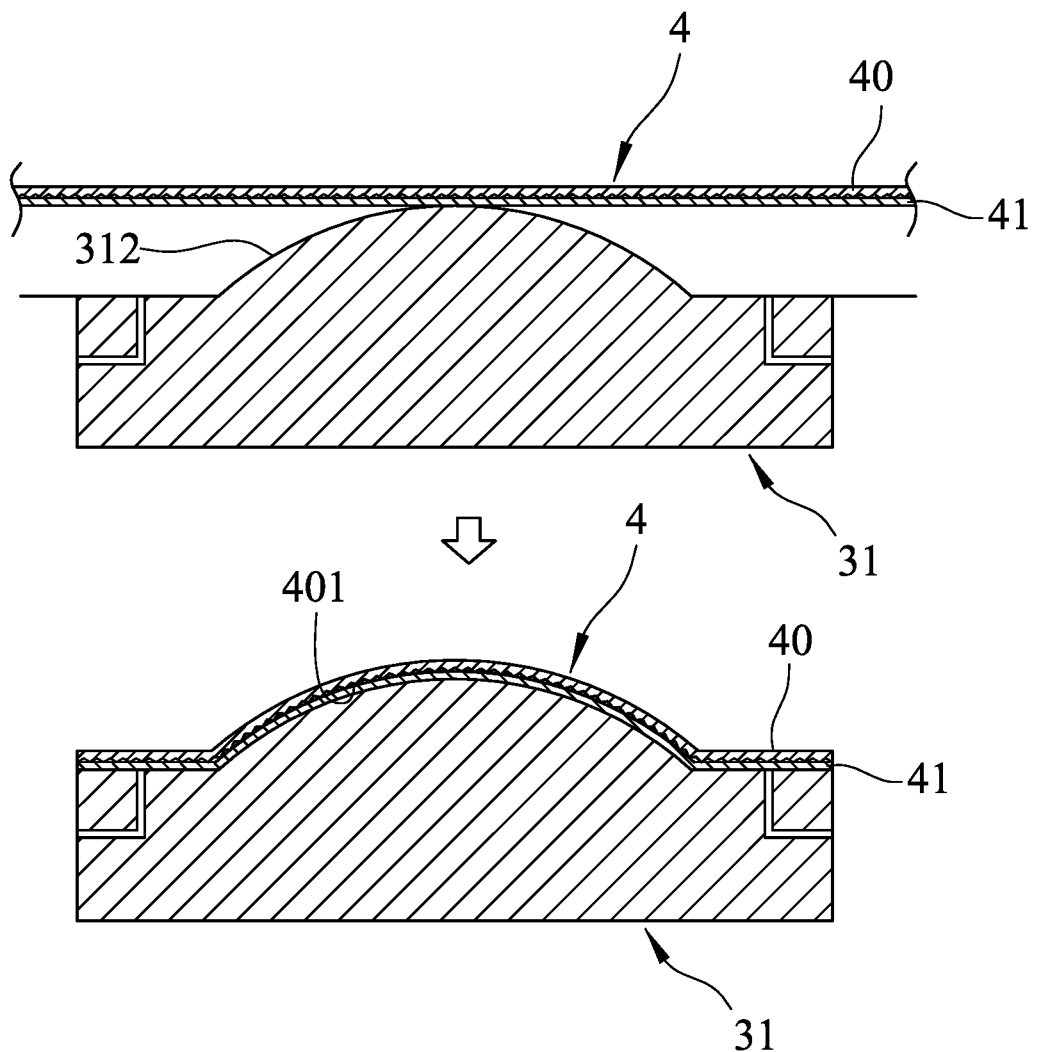
FIGS. 11 to 14 are schematic views showing consecutive steps of a third embodiment of a process for manufacturing a golf club head according to the disclosure.
Figure 12:
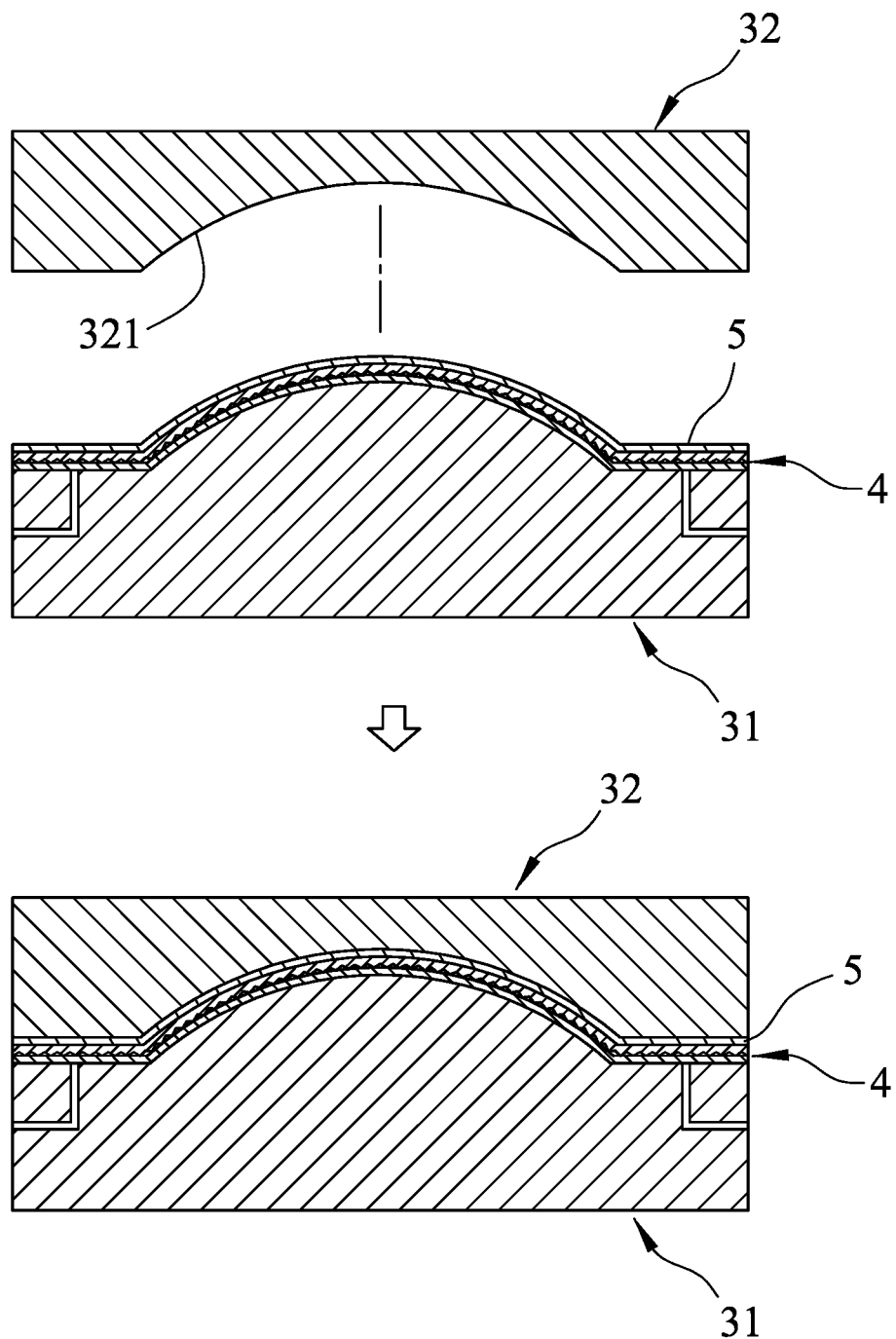
Figure 13:
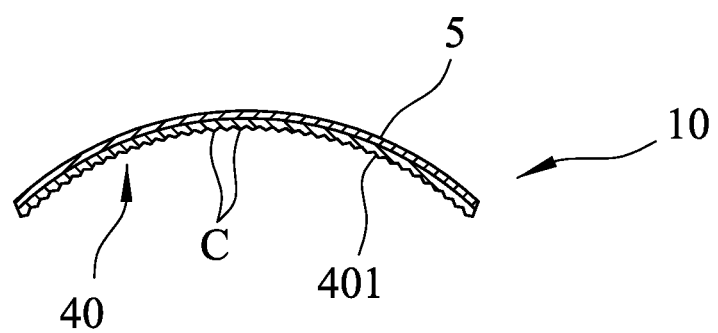
Figure 14:
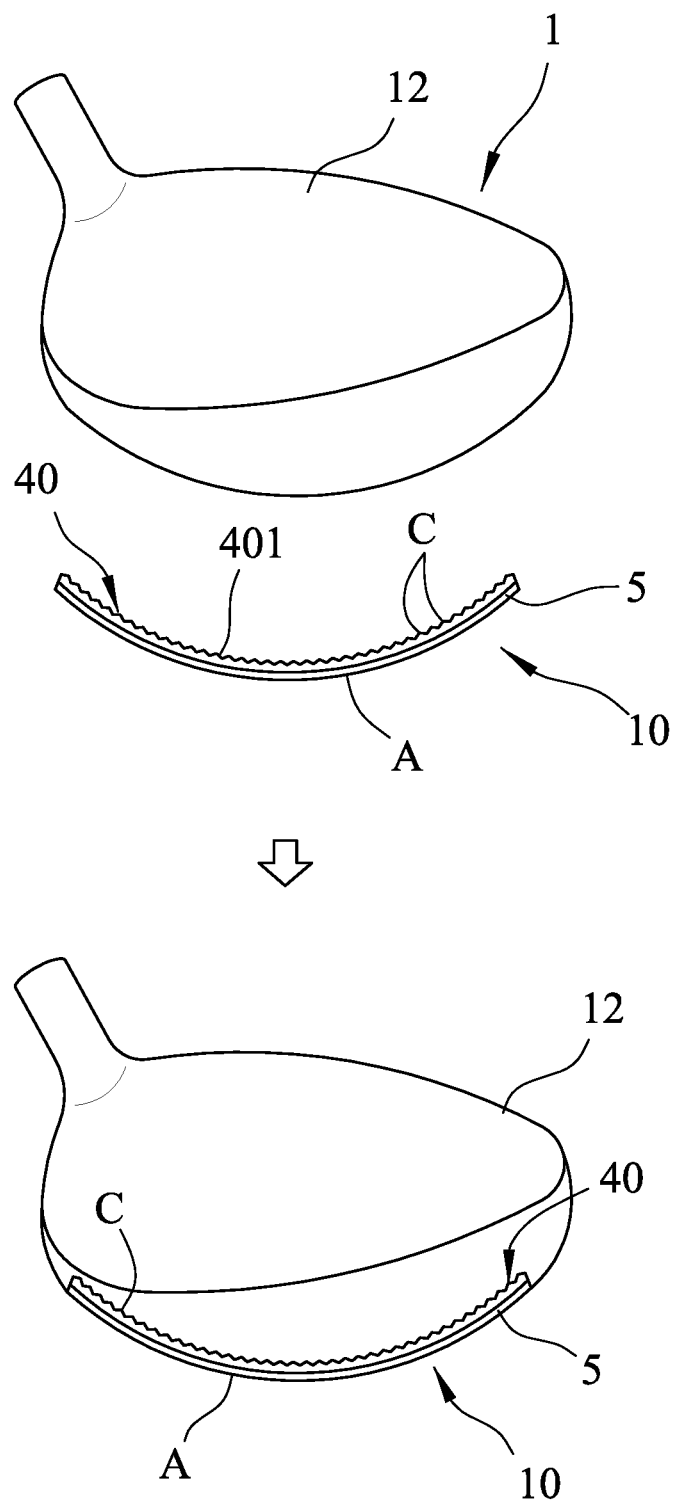

Referring to FIGS. 8, 9, and 10, a second embodiment of a process for manufacturing a golf club head according to the disclosure is shown to be similar to the first embodiment except that in the second embodiment, the patterned release film 4 has an upper surface 42' formed with a pattern which is to be transferred to the carbon fiber composite sheet 5 and which is complementary to that of the patterned topological region (A) of the decorative piece 10. Specifically, when the patterned release film 4 is released from the carbon fiber composite sheet 5 after step d), the decorative piece 10 which is formed from the carbon fiber composite sheet 5 is formed with the patterned topological region (A) having a pattern which is transferred from and complementary to that on the upper surface 42' of the patterned release film 4.

Referring to FIGS. 11, 12, 13, and 14, a third embodiment of a process for manufacturing a golf club head according to the disclosure is shown to be similar to the first embodiment except that in the third embodiment, the upward pressed region 312 of the lower mold half 31 is a convex surface, and the downward pressing region 321 of the upper mold half 32 is a concave surface which is configured to mate with the convex surface and to simulate a geometry of the patterned topological region (A) of the decorative piece 10. Furthermore, in the third embodiment, the pattern transfer layer 40 of the patterned release film 4 has a patterned region 401 which is a textured surface and which is to be formed as a textured patterned region (C) of the decorative piece 10. The releasing layer 41 is released from the pattern transfer layer 40 after step d) to expose the textured patterned region (C) of the decorative piece 10. In step e) of the third embodiment, the textured patterned region (C) of the decorative piece 10 is adhered to the depressed region (B) of the club head body 12. Therefore, as specifically shown in FIG. 14, in the golf club head 1 manufactured by the third embodiment, the patterned topological region (A) of the decorative piece 10 is disposed opposite to the textured patterned region (C) adhered to the depressed region (B) of the club head body 12. An outer surface of the carbon fiber composite sheet 5 serves as the patterned topological region (A) of the decorative piece 10. The adhesion of the decorative piece 10 to the depressed region (B) of the club head body 12 may be enhanced due to the textured surface of the textured patterned region (C) of the decorative piece 10.

Figure 15:
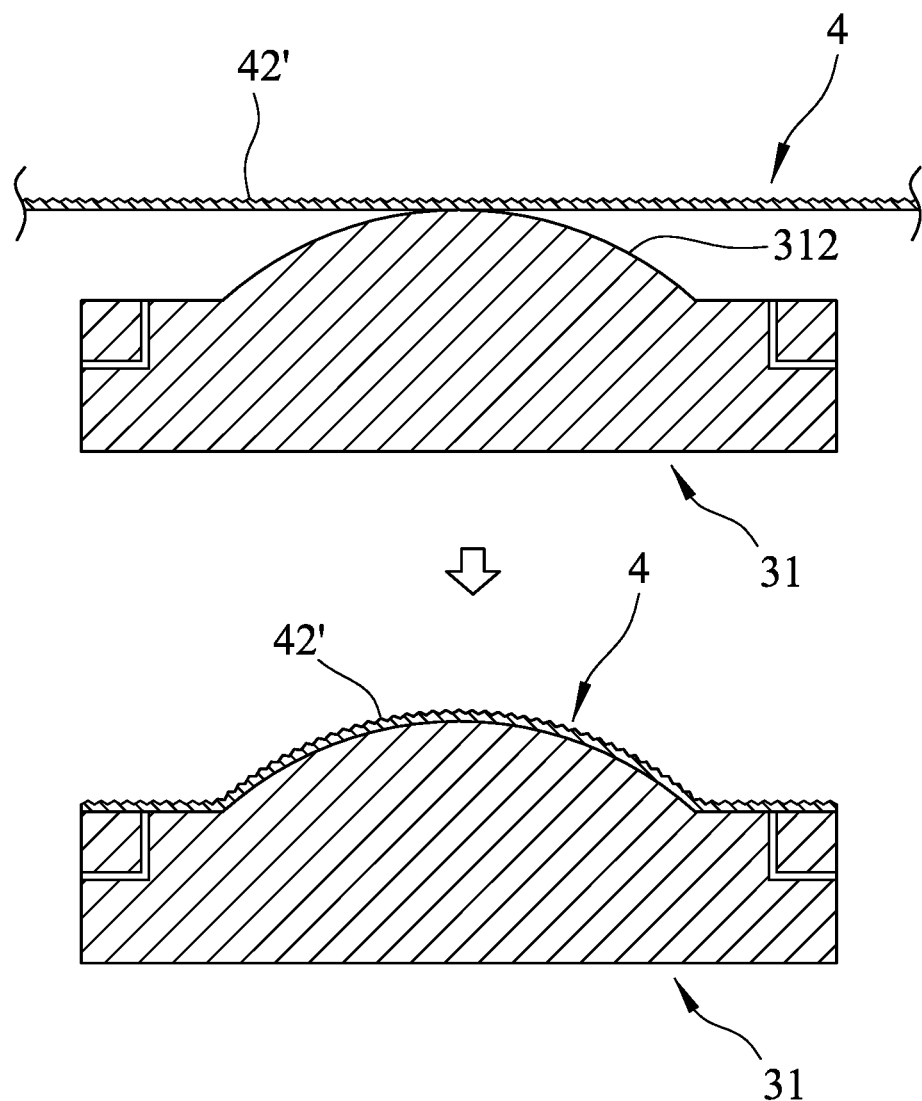
FIGS. 15 to 17 are schematic views showing consecutive steps of a fourth embodiment of a process for manufacturing a golf club head according to the disclosure.
Figure 16:
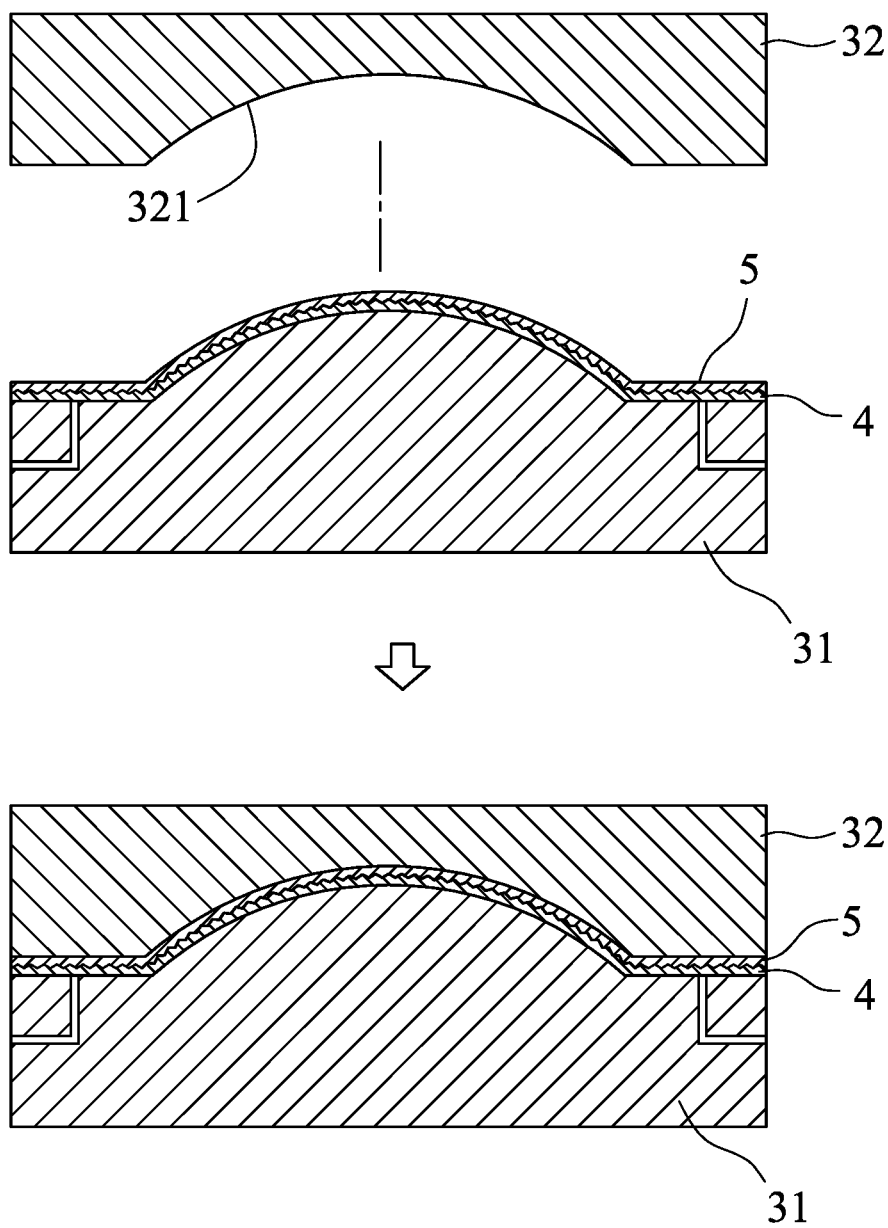
Figure 17:
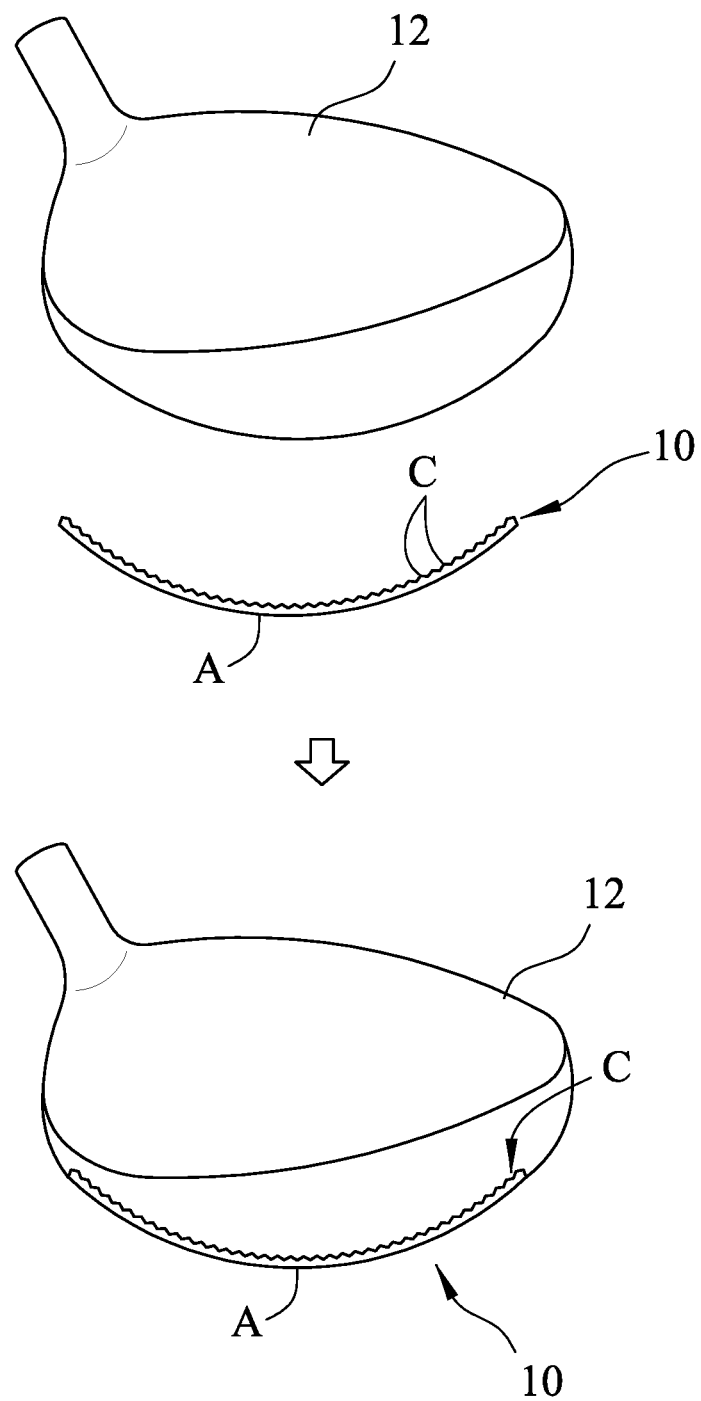

Referring to FIGS. 15, 16, and 17, a fourth embodiment of a process for manufacturing a golf club head according to the disclosure is shown to be similar to the third embodiment except that in the fourth embodiment, the patterned release film 4 has an upper surface 42' formed with a pattern which is to be transferred to the carbon fiber composite sheet 5 and which is complementary to that of the textured patterned region (C) of the decorative piece 10. Specifically, when the patterned release film 4 is released from the carbon fiber composite sheet 5 after step d), the decorative piece 10 which is formed from the carbon fiber composite sheet 5 is formed with the textured patterned region (C) having a pattern which is transferred from and complementary to that on the upper surface 42' of the patterned release film 4.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A process for manufacturing a golf club head which includes a club head body that is formed with a depressed region (B) and a decorative piece that is fitted into the depressed region (B) of the club head body in conformity with shape of the depressed region (B) and that has a patterned topological region (A) to make up an outer surface of the club head body, the process comprising steps of:
   a) placing a patterned release film on a lower mold half which has an upward pressed region configured to simulate a geometry of the patterned topological region (A) of the decorative piece;
   b) making the patterned release film intimately contact the upward pressed region of the lower mold half;
   c) laminating a carbon fiber composite sheet on the patterned release film to form a laminate;
   d) hot-pressing the laminate by pressing a downward pressing region of an upper mold half toward the upward pressed region of the lower mold half to thereby form the decorative piece;
   e) fitting the decorative piece into the depressed region (B) of the club head body to obtain the golf club head,
   wherein the upward pressed region of the lower mold half is a concave surface, and the downward pressing region of the upper mold half is a convex surface which is configured to mate with the concave surface,
   wherein step b) is performed by vacuum pumping; and
   wherein in step b), the patterned release film includes a releasing layer which is releasable and which has a lower surface that is brought into intimate contact with the upward pressed region of the lower mold half, and a pattern transfer layer which has a patterned region that is to be formed as the patterned topological region (A) of the decorative piece and that is releasably attached to an upper surface of the releasing layer.

2. The process according to claim 1, wherein the patterned region of the pattern transfer layer is a textured surface.

3. The process according to claim 1, further comprising, between steps d) and e), a step of releasing the releasing layer from the pattern transfer layer.

4. The process according to claim 1, wherein in step e), a free surface of the carbon fiber composite sheet of the decorative piece is adhered to the depressed region (B) of the club head body.

5. The process according to claim 1, wherein step d) is performed at a molding temperature ranging from 120° C. to 180° C.

6. A process for manufacturing a golf club head which includes a club head body that is formed with a depressed region (B) and a decorative piece that is fitted into the depressed region (B) of the club head body in conformity with shape of the depressed region and that has a patterned topological region (A) to make up an outer surface of the club head body, the process comprising steps of:
   a) placing a patterned release film on a lower mold half which has an upward pressed region;
   b) making the patterned release film intimately contact the upward pressed region of the lower mold half;
   c) laminating a carbon fiber composite sheet on the patterned release film to form a laminate;
   d) hot-pressing the laminate by pressing a downward pressing region of an upper mold half toward the upward pressed region of the lower mold half to thereby form the decorative piece, the downward pressing region being configured to simulate a geometry of the patterned topological region (A) of the decorative piece;
   e) fitting the decorative piece into the depressed region (B) of the club head body to obtain the golf club head,
   wherein the upward pressed region of the lower mold half is a convex surface, and the downward pressing region of the upper mold half is a concave surface which is configured to mate with the convex surface,
   wherein step b) is performed by vacuum pumping; and
   wherein in step b), the patterned release film includes a releasing layer which is releasable and which has a lower surface that is brought into intimate contact with the upward pressed region of the lower mold half, and a pattern transfer layer which has a patterned region that is to be formed as a textured patterned region (C) of the decorative piece and that is releasably attached to an upper surface of the releasing layer.

7. The process according to claim 6, wherein the patterned region of the pattern transfer layer is a textured surface.

8. The process according to claim 6, further comprising, between steps d) and e), a step of releasing the releasing layer from the pattern transfer layer to expose the textured patterned region (C) of the decorative piece.

9. The process according to claim 8, wherein in step e), the textured patterned region (C) of the decorative piece is adhered to the depressed region (B) of the club head body.

10. The process according to claim 6, wherein step d) is performed at a molding temperature ranging from 120° C. to 180° C.

\* \* \* \* \*